US009820112B2

(12) United States Patent
Sergeev et al.

(10) Patent No.: US 9,820,112 B2
(45) Date of Patent: Nov. 14, 2017

(54) METHOD OF AND SYSTEM FOR PROVISIONING PUBLIC SAFETY COMMUNICATION DEVICES VIA A WIRELESS LOCAL AREA NETWORK PROTOCOL TO COMMUNICATE WITH ONE ANOTHER IN A COMMON TALK GROUP CONFIGURATION

(71) Applicants: Vladimir A. Sergeev, St. Petersburg (RU); Dmitry V. C. Prakash Igumnov, St. Petersburg (RU); David E. Klein, Davie, FL (US)

(72) Inventors: Vladimir A. Sergeev, St. Petersburg (RU); Dmitry V. C. Prakash Igumnov, St. Petersburg (RU); David E. Klein, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 83 days.

(21) Appl. No.: 14/913,780

(22) PCT Filed: Oct. 18, 2013

(86) PCT No.: PCT/RU2013/000920
§ 371 (c)(1),
(2) Date: Feb. 23, 2016

(87) PCT Pub. No.: WO2015/057097
PCT Pub. Date: Apr. 23, 2015

(65) Prior Publication Data
US 2016/0227382 A1    Aug. 4, 2016

(51) Int. Cl.
*H04W 4/08* (2009.01)
*H04W 4/22* (2009.01)

(52) U.S. Cl.
CPC ............... *H04W 4/08* (2013.01); *H04W 4/22* (2013.01)

(58) Field of Classification Search
CPC ........... H04W 4/08; H04W 4/22; H04W 4/10; H04W 48/18; H04W 8/00; H04W 84/18; H04W 88/06; H04W 88/18; H04L 29/06
See application file for complete search history.

(56) References Cited

U.S. PATENT DOCUMENTS 6,469,991 B1 * 10/2002 Chuah ................. H04L 43/0847
370/329
6,493,629 B1 * 12/2002 Van Bosch ............. G08G 1/205
701/515

(Continued)

FOREIGN PATENT DOCUMENTS

AU    2011253870 A1    1/2012
EP       1641184 A1    3/2006

(Continued)

OTHER PUBLICATIONS

International Search Report and Written Opinion, PCT/RU2013/000920, filed Oct. 18, 2013, all pages.

*Primary Examiner* — Chuong A Ngo

(57) ABSTRACT

Public safety (PS) communication devices are provisioned at an incident scene to communicate with each other in a common talk group configuration. Talk group information is contained in a beacon message that is broadcast by an initiating PS device in an access point mode of operation via a Wi-Fi network protocol compatible with at least one version of IEEE standard 802.11. The beacon message is received via the same Wi-Fi protocol at another PS device in a station mode of operation and processed to configure the other PS device with the talk group information.

17 Claims, 4 Drawing Sheets

(56) References Cited

U.S. PATENT DOCUMENTS

| | | |
|---|---|---|
| 2007/0030824 A1 | 2/2007 | Ribaudo et al. |
| 2007/0202908 A1* | 8/2007 | Shaffer ................ H04W 4/021 455/518 |
| 2007/0242643 A1 | 10/2007 | Chandra et al. |
| 2008/0225805 A1 | 9/2008 | Pearson et al. |
| 2010/0165879 A1 | 7/2010 | Gupta et al. |
| 2010/0232337 A1 | 9/2010 | Das et al. |
| 2012/0106527 A1 | 5/2012 | Ichikawa et al. |
| 2012/0177022 A1 | 7/2012 | Ichikawa |
| 2013/0272134 A1 | 10/2013 | Miller et al. |

FOREIGN PATENT DOCUMENTS

| | | |
|---|---|---|
| EP | 1686701 A1 | 8/2006 |
| GB | 2319436 A1 | 5/1998 |
| WO | 2010028278 A2 | 3/2010 |
| WO | 2012113136 A1 | 8/2012 |

* cited by examiner

METHOD OF AND SYSTEM FOR PROVISIONING PUBLIC SAFETY COMMUNICATION DEVICES VIA A WIRELESS LOCAL AREA NETWORK PROTOCOL TO COMMUNICATE WITH ONE ANOTHER IN A COMMON TALK GROUP CONFIGURATION

FIELD OF THE DISCLOSURE

The present disclosure relates generally to a method of, and a system for, provisioning public safety (PS) communications devices, e.g., handheld land mobile radios and vehicular radios, by broadcasting and receiving a beacon message containing talk group information via a wireless local area network protocol, such as a Wi-Fi network protocol compatible with at least one version of IEEE standard 802.11, to enable the PS devices to communicate with one another in a common talk group configuration.

BACKGROUND

In an emergency or like incident, public safety (PS) personnel, such as police officers, firefighters, paramedics, emergency medical service technicians, disaster relief workers, military rescue personnel, and like first responders, are typically dispatched to an incident scene to respond to remedy the emergency. These PS personnel typically utilize PS communication devices, both handheld and vehicle-portable, while working in the field. PS communication devices include, for example, land mobile radios (LMRs), such as handheld radios and/or vehicular radios, along with accessories, such as microphones, speakers, earpieces, headsets, and the like, to support wireless, two-way, voice and data communications. These primary, mission-critical PS devices and the infrastructure to support their operation are typically operated as part of a private, secure, and protected, proprietary PS network governed by a PS agency, e.g., a local government or department.

As advantageous as the known PS networks have been, there are circumstances where a more expedited and effective resolution of the incident is needed. Thus, it is known for PS personnel from different agencies to arrive at the incident scene and not all be able to communicate with one another with their respective PS devices. For example, police officers may not be able to communicate with firefighters, and vice versa, and none of them might be able to communicate with paramedics or other first responders. Even PS personnel from the same agency may not all be able to communicate with one another. For example, in a fire emergency, firefighters might be grouped in different response teams, e.g., ladder, search-and-rescue, etc., and these different teams may not be in mutual communication. This lack of communication is due to many factors, such as different PS devices, different PS device manufacturers, different software on the PS devices, different encryption keys, complex user interfaces, lack of channel information, lack of a configuration computer, lack of programming skills, etc. This lack of communication prevents all the PS personnel from grasping the full nature of the incident, and prevents efficient cooperation with one another to resolve the incident.

Accordingly, there is a need for reliably and rapidly enabling the PS devices at an incident scene to communicate with one another in a common talk group configuration to efficiently resolve the incident.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
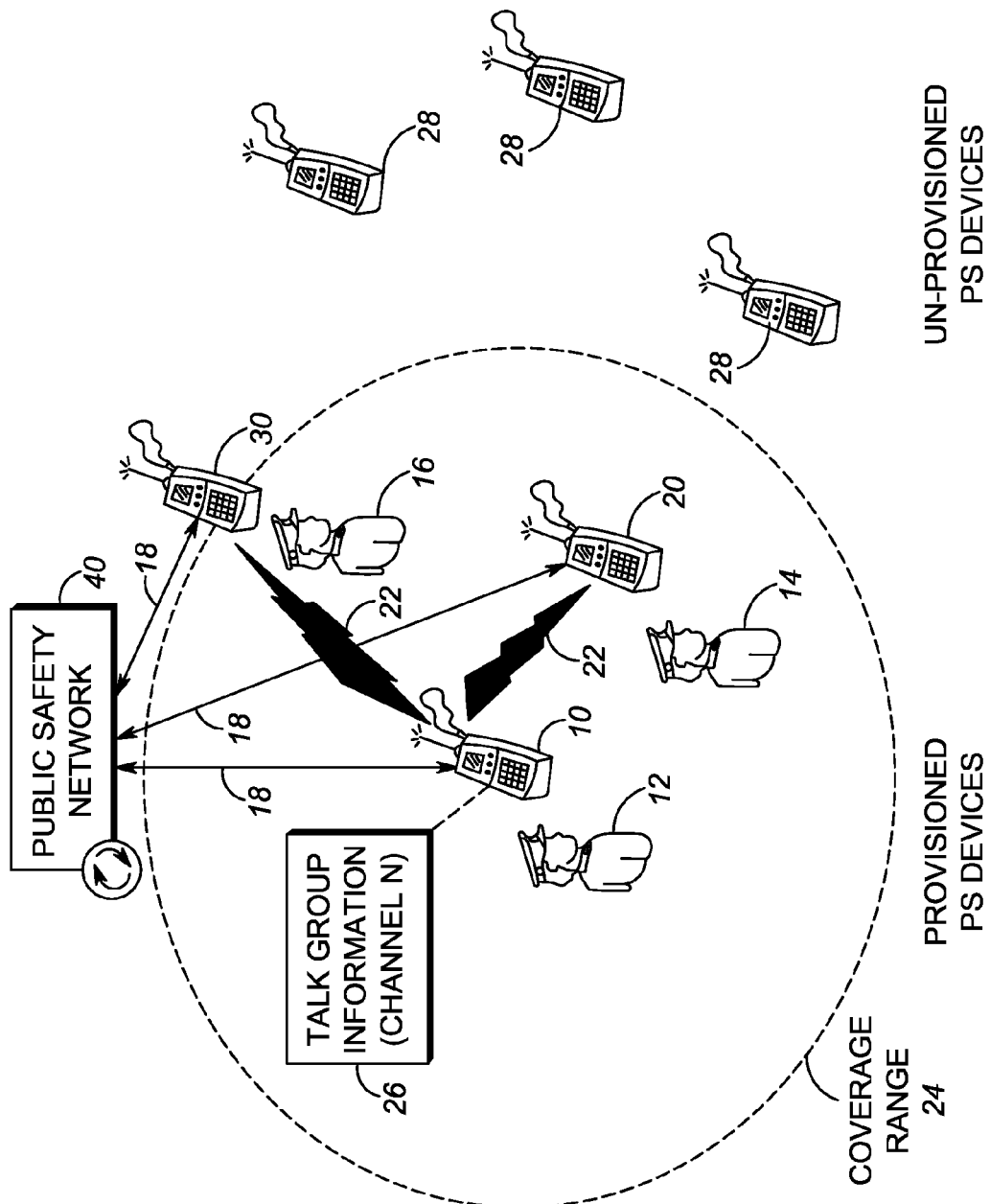
FIG. 1 is a pictorial, schematic view of a system for provisioning public safety (PS) communications devices via a wireless local area network protocol in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a method of provisioning wireless public safety (PS) communication devices at an incident scene to communicate with each other in a common talk group configuration. This configuration can be over a PS network, or directly via at least one PS broadcast channel. The method is performed by initiating a provisioning request from an initiating PS device at the incident scene, by configuring talk group information, e.g., a channel parameter, associated with the initiating PS device in response to the provisioning request, and by broadcasting the talk group information as a broadcast message from the initiating PS device over a coverage range at the incident scene via a wireless local area network protocol. Preferably, the broadcasting is performed by activating an access point mode of operation for the initiating PS device, and by broadcasting the talk group information as a beacon message from the activated initiating PS device via a Wi-Fi network protocol compatible with at least one version of IEEE standard 802.11.

The method is further performed by receiving the broadcast message via the wireless local area network protocol at another PS device within the coverage range at the incident scene, by processing the broadcast message to obtain the talk group information at the other PS device, and by provisioning the other PS device with the obtained talk group information to enable both the initiating PS device and the other PS device to communicate in the common talk group configuration. Preferably, the receiving is performed by activating a station mode of operation for the other PS device, and by receiving the beacon message at the activated other PS device via the Wi-Fi network protocol compatible with at least one version of IEEE standard 802.11. PS personnel operating these PS devices at an incident can now grasp the full nature of the incident, and efficiently cooperate with one another to resolve the incident.

In a preferred embodiment, an acknowledgement receipt request from one or more PS devices may be configured in the beacon message. If one or more acknowledgement receipt responses are received from other PS devices, then the access point mode may be deactivated. The initiating PS device would have a member list of all the PS devices in the talk group configuration. The talk group may be limited in number due to performance reasons. Once the initiating PS device receives a given number of responses, then the access point mode may be deactivated. If no acknowledgement receipt response is received from any of the other PS devices, then the beacon message may be repetitively broadcast until an appropriate number of acknowledgement receipt responses are received from the other PS devices.

A system, in accordance with another aspect of this disclosure, is operative for provisioning wireless public safety (PS) communication devices at an incident scene to communicate with each other in a common talk group configuration. This configuration can be over a PS network, or directly via at least one PS broadcast channel. The system includes an initiating PS device at the incident scene for initiating a provisioning request, a first controller at the initiating PS device for configuring talk group information associated with the initiating PS device in response to the provisioning request, and a first transceiver at the initiating PS device for broadcasting the talk group information as a broadcast message from the initiating PS device over a coverage range at the incident scene via a wireless local area network protocol.

The system further includes a second transceiver at another PS device for receiving the broadcast message via the wireless local area network protocol within the coverage range at the incident scene, and a second controller at the other PS device for processing the broadcast message to obtain the talk group information at the other PS device, and for provisioning the other PS device with the obtained talk group information to enable both the initiating PS device and the other PS device to communicate with each other in the common talk group configuration.

Turning now to the drawings, reference numeral 10 in FIG. 1 generally identifies an initiating wireless public safety (PS) communication device operated at a scene of an incident by a PS person 12, who is typically the first to arrive at the incident scene, or is the person in charge of resolving the incident. Other PS personnel 14, 16 arriving at the incident scene operate their own respective PS communication devices 20, 30. The PS personnel 12, 14, 16 are typically police officers, firefighters, paramedics, emergency medical service technicians, disaster relief workers, military rescue personnel, and like first responders, who are typically dispatched to the incident scene by a call center that is part of a PS network 40. Although three PS personnel have been illustrated in FIG. 1, it will be understood that the number varies with the nature of the incident.

The illustrated PS devices 10, 20, 30 are handheld land mobile radios (LMRs), but they also may be vehicular radios. The PS devices 10, 20, 30 typically include built-in or remote accessories, such as microphones, speakers, earpieces, headsets, and the like, to support wireless, two-way, voice and data communications. These primary, mission-critical PS devices 10, 20, 30 and the infrastructure to support their operation are typically operated as part of the private, secure, and protected, proprietary PS network 40 governed by a PS agency, e.g., a local government or department, over bidirectional wireless links 18. Each link 18 may operate under the Wi-Fi, 2G, 3G, 4G, or long-term evolution (LTE), standard, and like standards, all of which are open network communication protocols for wireless transmission of voice and data.

Figure 2:
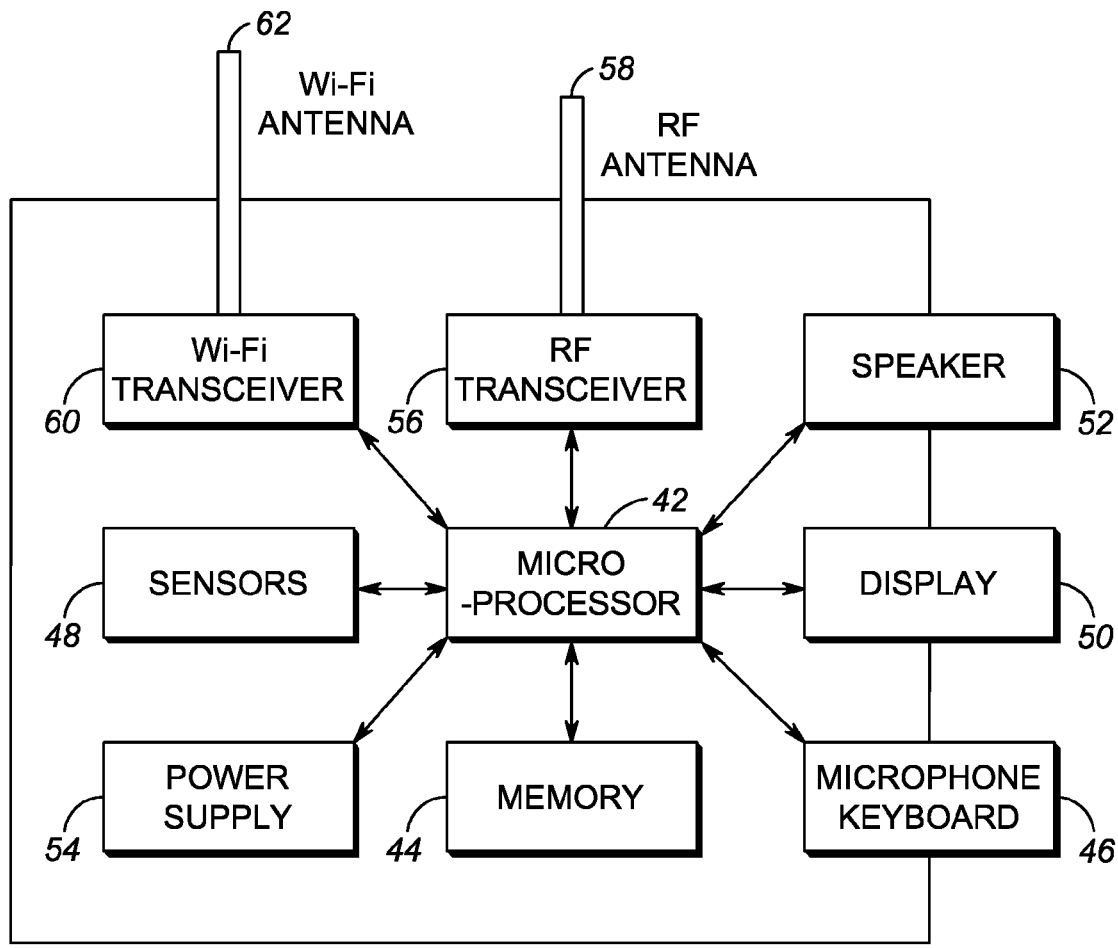
FIG. 2 is a schematic view of components of each PS device of FIG. 1.

As illustrated in FIG. 2, for the representative PS device 10, each PS device 10, 20, 30 typically has a controller or programmed microprocessor 42 for running applications on a mobile operating system, an on-board memory 44, a plurality of manual inputs 46 such as a keyboard (real or electronic) and a microphone, a plurality of sensors 48 such as a GPS sensor, a display screen 50, a speaker 52, a power supply 54, a radio frequency (RF) transceiver 56 for communicating with the PS network 40 over the bidirectional wireless link 18 via an RF antenna 58, and a Wi-Fi transceiver 60 for communicating via a Wi-Fi antenna 62 with other PS devices over a bidirectional wireless link 22 (see FIG. 1) over a coverage range 24 in a provisioning operation, as described below.

As described above, the PS devices 10, 20, 30 are often not configured to communicate with one another due to such factors as different PS device manufacturers, different software on the PS devices, different encryption keys, complex user interfaces, lack of channel information, lack of a configuration computer, lack of programming skills, etc. The PS personnel 12, 14, 16, therefore, are prevented from grasping the full nature of the incident, and cannot efficiently cooperate with one another to resolve the incident. One aspect of this disclosure is, therefore, to provision the PS devices 10, 20, 30 so that they can all readily communicate with one other in a common talk group configuration, thereby achieving the cooperation needed to resolve the incident.

The provisioning operation is performed by initiating a provisioning request from the initiating PS device 10 at the incident scene. This can be accomplished manually at the input 46 by the PS person 10 by pressing a key on the keyboard, or by speaking into the microphone. This can also be accomplished automatically when the GPS sensor 48 detects that the initiating PS device 10 has indeed arrived at the incident scene.

In response to the provisioning request, the controller 42 at the initiating PS device 10 configures talk group information 26 (see FIG. 1) associated with the initiating PS device 10. This talk group information 26 includes the parameters needed to establish a talk group, e.g., a channel (N), an identification number, a frequency, an encryption key, a communications protocol, etc. The controller 42 at the initiating PS device 10 formats this talk group information 26 as a broadcast message, and broadcasts the broadcast message from the initiating PS device 10 over the coverage range 24 via a wireless local area network protocol, and preferably via the Wi-Fi transceiver 60.

Advantageously, the controller 42 at the initiating PS device 10 activates an access point mode of operation for the initiating PS device 10. In the access point mode, the broadcast message is configured as a beacon message via a Wi-Fi network protocol compatible with at least one version of IEEE standard 802.11. In wireless communication networks compatible with, or compliant to, the IEEE 802.11x standards, wireless devices may associate themselves with a particular access point by responding to, and associating with, that access point's beacon signal, which is a signal that is transmitted by the access point periodically in order to make its presence and association parameters known to wireless devices in the access point's coverage area. The talk group information 26 contained in the beacon message or signal may be contained in one or more beacon frames.

The provisioning operation is further performed by receiving the broadcast message via the wireless local area network protocol over wireless links 22 at another PS device, e.g., devices 20, 30, located within the coverage range 24 at the incident scene. When Wi-Fi is employed as the protocol, then the controller 42 at each PS device 20, 30 is operative for activating a station mode of operation. The Wi-Fi transceiver 60 at each PS device 20, 30 is operative for receiving the beacon message. The controller 42 at each PS device 20, 30 is then operative for processing the received beacon message to obtain the talk group information 26 at the other PS devices 20, 30, and for provisioning the other PS devices 20, 30 with the obtained talk group information 26 to enable both the initiating PS device 10 and the other PS devices 20, 30 to communicate with one other in the common talk group configuration.

The provisioning is performed by the Wi-Fi transceiver 60 in each PS device over individual links 22. Once provisioned, the PS devices can communicate with one another in a common talk group over individual links 18 over the PS network 40, or directly via at least one PS broadcast channel. FIG. 1 also illustrates other PS devices 28 that are outside the coverage range 24 and, thus, have not been provisioned.

Advantageously, an acknowledgement receipt request from one or more PS devices 20, 30 may be configured in the beacon message. If one or more acknowledgement receipt responses are received from other PS devices 20, 30, then the access point mode may be deactivated. The initiating PS device 10 would have a member list of all the PS devices 20, 30 in the talk group configuration. The talk group may be limited in number due to performance reasons. Once the initiating PS device 10 receives a given number of responses, then the access point mode may be deactivated. If no acknowledgement receipt response is received from any of the other PS devices 20, 30, then the beacon message may be repetitively broadcast until an appropriate number of acknowledgement receipt responses are received from the other PS devices 20, 30.

Figure 3:
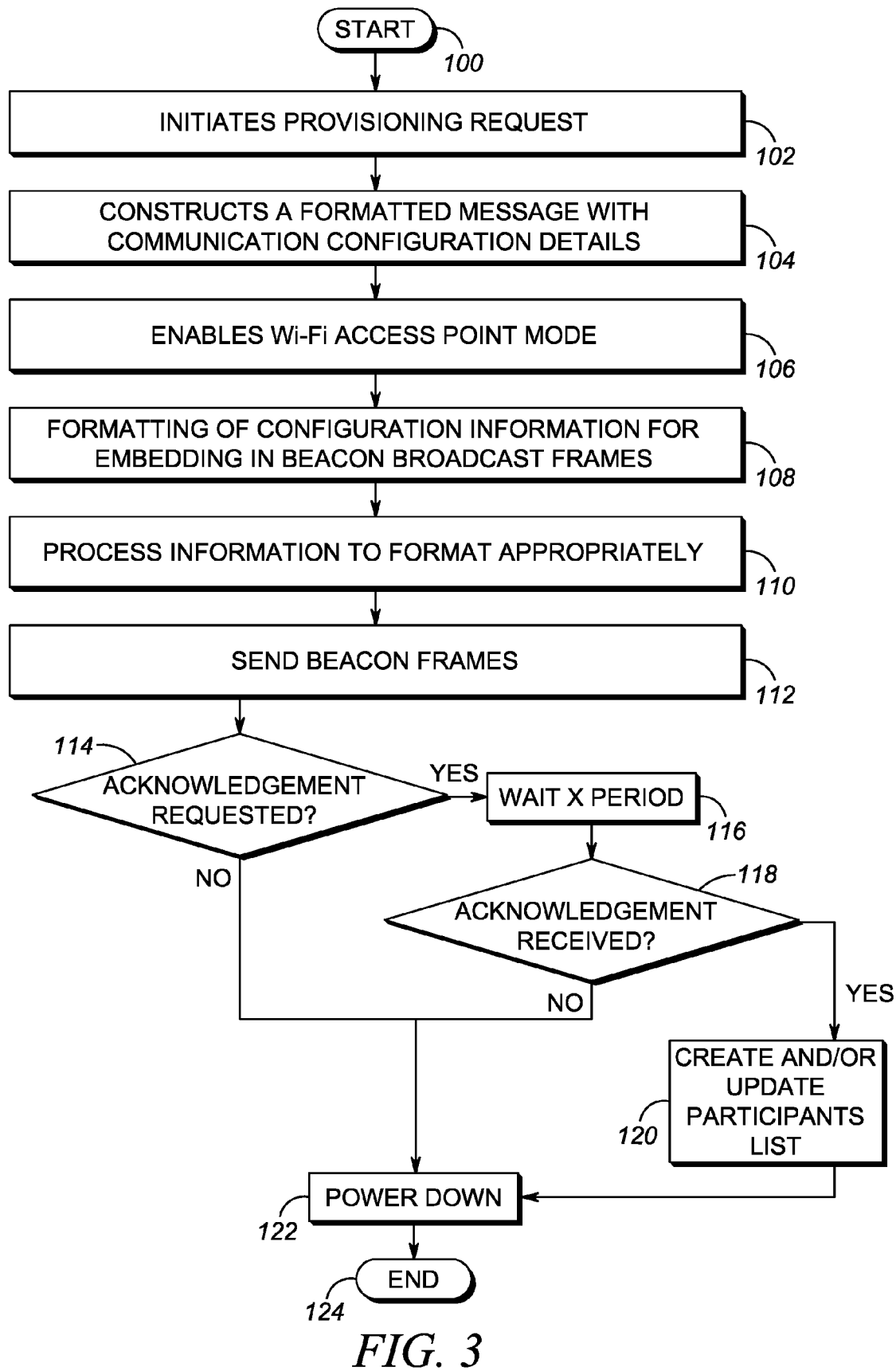
FIG. 3 is a flow chart depicting steps of a method performed by an initiating PS device in the system of FIG. 1.

Referring now to the flow chart of FIG. 3, this depicts steps performed by the initiating PS device 10. Starting at the start step 100, a provisioning request is initiated at the initiating PS device 10 at step 102. The initiating PS device 10 next constructs a formatted message containing the talk group information 26, i.e., the details of the communication configuration, at step 104. Next, the initiating PS device 10 is set to the Wi-Fi access point mode at step 106. Then, the initiating PS device 10 formats the talk group information 26 in one or more beacon frames of a beacon message at step 106. The talk group information 26 is processed at step 110, and is then broadcast at step 112. If acknowledgement of receipt from at least one other PS device 20, 30 was requested in decision block 114, then after waiting for a predetermined time period at step 116, it is determined at decision block 118 whether the appropriate number of acknowledgements was received. If so, then the initiating PS device 10 creates or updates a list of PS personnel in the talk group at step 120. If not, then the initiating PS device 10 can either request another acknowledgement, or power down to save power at step 122 before ending at step 124.

Figure 4:
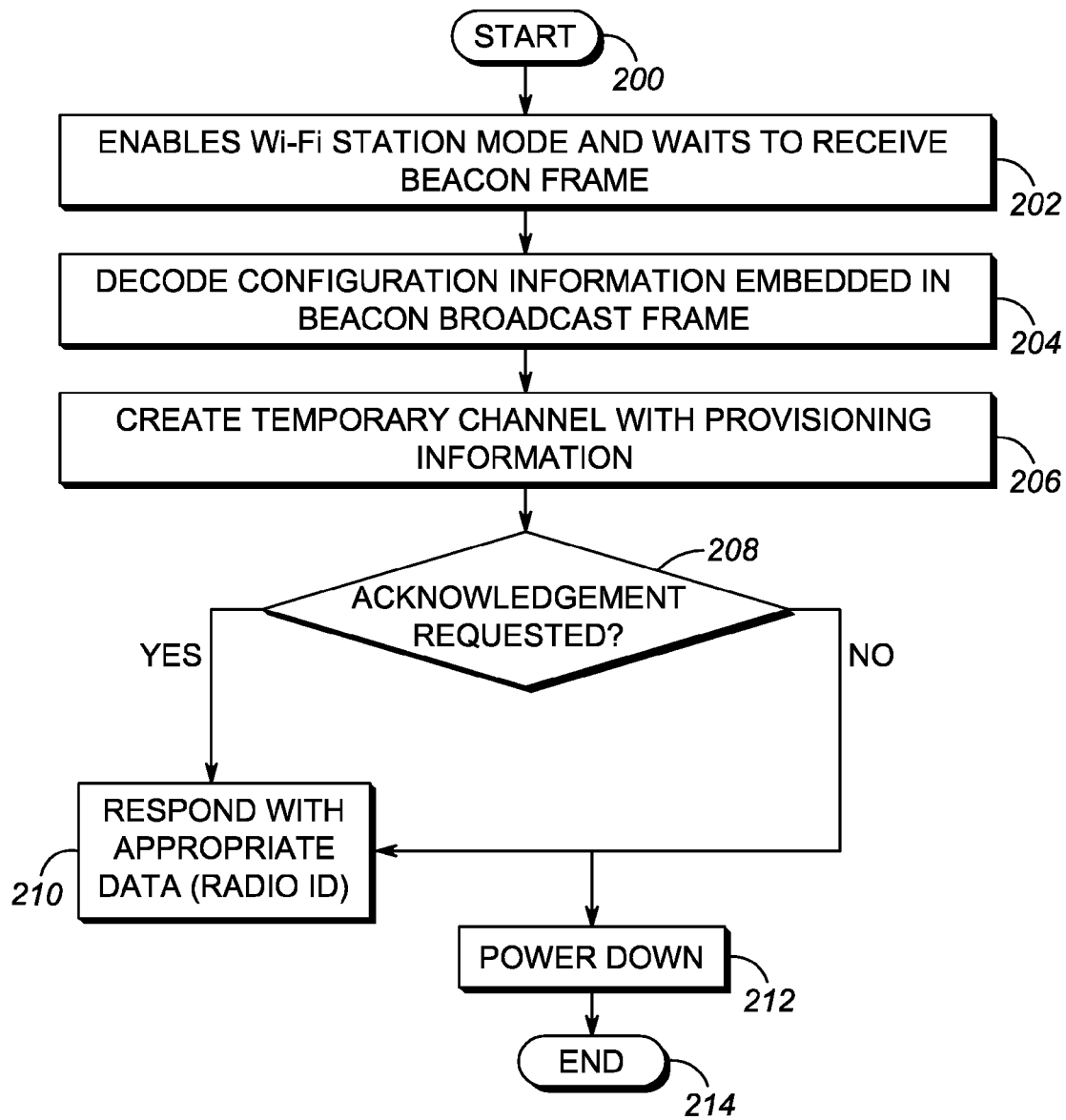
FIG. 4 is a flow chart depicting steps of a method performed by a PS device being provisioned in the system of FIG. 1.

Referring now to the flow chart of FIG. 4, this depicts steps performed by each PS device 20, 30 being provisioned. Starting at the start step 200, the PS device 20, 30 is set to the Wi-Fi station mode, and waits to receive the beacon frames of the beacon message at step 202. At step 204, the PS device 20, 30 processes and decodes the talk group information 26 in the received beacon message. At step 206, the PS device 20, 30 creates a temporary channel (N) for the talk group. If acknowledgement of receipt was requested in decision block 208, then the acknowledgement is sent at step 210. If no acknowledgement was requested, then the PS device 20, 30 is powered down to save power at step 212 before ending at step 214.

In the foregoing specification, specific embodiments have been described. However, one of ordinary skill in the art appreciates that various modifications and changes can be made without departing from the scope of the invention as set forth in the claims below. For example, boundaries can be set for the coverage range to enable multiple coverage areas to be established at an incident scene. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of provisioning wireless public safety (PS) communication devices at an incident scene to communicate with each other in a common talk group configuration, the method comprising:
   initiating a provisioning request from an initiating PS device at the incident scene;
   configuring talk group information associated with the initiating PS device in response to the provisioning request;
   broadcasting the talk group information as a broadcast message from the initiating PS device over a coverage range at the incident scene via a wireless local area network protocol;
   receiving the broadcast message via the wireless local area network protocol at another PS device within the coverage range at the incident scene;
   processing the broadcast message to obtain the talk group information at the other PS device; and
   provisioning the other PS device with the obtained talk group information to enable both the initiating PS device and the other PS device to communicate with each other in the common talk group configuration.

2. The method of claim 1, wherein the initiating is performed manually at the initiating PS device.

3. The method of claim 1, wherein the configuring is performed by configuring the talk group information with channel parameters.

4. The method of claim 1, wherein the broadcasting is performed by activating an access point mode of operation for the initiating PS device, and by broadcasting the talk group information as a beacon message from the activated initiating PS device via a Wi-Fi network protocol compatible with at least one version of IEEE standard 802.11.

5. The method of claim 4, wherein the broadcasting is performed by configuring an acknowledgement receipt request in the beacon message, and receiving an acknowledgement receipt response from at least one other PS device, and deactivating the access point mode after receipt of the response.

6. The method of claim 4, wherein the broadcasting is performed by configuring an acknowledgement receipt request in the beacon message, and deactivating the access point mode if no acknowledgement receipt response is received from the other PS device.

7. The method of claim 4, wherein the broadcasting is performed by configuring an acknowledgement receipt request in the beacon message, and by repetitively broadcasting the beacon message until an acknowledgement receipt response is received from at least one other PS device.

8. The method of claim 4, wherein the receiving is performed by activating a station mode of operation for the other PS device, and by receiving the beacon message at the activated other PS device via the Wi-Fi network protocol compatible with at least one version of IEEE standard 802.11.

9. A system for provisioning wireless public safety (PS) communication devices at an incident scene to communicate with each other in a common talk group configuration, the system comprising:
   an initiating PS device at the incident scene for initiating a provisioning request;
   a first controller at the initiating PS device for configuring talk group information associated with the initiating PS device in response to the provisioning request;
   a first transceiver at the initiating PS device for broadcasting the talk group information as a broadcast message from the initiating PS device over a coverage range at the incident scene via a wireless local area network protocol;
   a second transceiver at another PS device for receiving the broadcast message via the wireless local area network protocol within the coverage range at the incident scene; and
   a second controller at the other PS device for processing the broadcast message to obtain the talk group information at the other PS device, and for provisioning the other PS device with the obtained talk group information to enable both the initiating PS device and the other PS device to communicate with each other in the common talk group configuration.

10. The system of claim 9, wherein the initiating PS device has a manual input for entering the provisioning request.

11. The system of claim 9, wherein the first controller is operative for configuring the talk group information with channel parameters.

12. The system of claim 9, wherein the first controller is operative for activating an access point mode of operation for the initiating PS device, and wherein the first transceiver is operative for broadcasting the talk group information as a beacon message from the activated initiating PS device via a Wi-Fi network protocol compatible with at least one version of IEEE standard 802.11.

13. The system of claim 12, wherein the first controller is operative for configuring an acknowledgement receipt request in the beacon message, wherein the first transceiver is operative for receiving an acknowledgement receipt response from at least one other PS device, and wherein the first controller is operative for deactivating the access point mode after receipt of the response.

14. The system of claim 12, wherein the first controller is operative for configuring an acknowledgement receipt request in the beacon message, and for deactivating the access point mode if no acknowledgement receipt response is received from the other PS device.

15. The system of claim 12, wherein the first controller is operative for configuring an acknowledgement receipt request in the beacon message, wherein the first transceiver is operative for repetitively broadcasting the beacon message until an acknowledgement receipt response is received from at least one other PS device.

16. The system of claim 12, wherein the second controller is operative for activating a station mode of operation for the other PS device, and wherein the second transceiver is operative for receiving the beacon message at the activated other PS device via the Wi-Fi network protocol compatible with at least one version of IEEE standard 802.11.

17. The system of claim 9, wherein each PS device is one of a handheld land mobile radio and a vehicular radio.

* * * * *